July 9, 1968  S. L. SEYMOUR  3,392,006

GLASS GRIPPING TONGS AND TREATMENT THEREOF

Filed April 27, 1967

INVENTOR
SAMUEL L. SEYMOUR
ATTORNEYS

United States Patent Office 3,392,006
Patented July 9, 1968

3,392,006
GLASS GRIPPING TONGS AND
TREATMENT THEREOF
Samuel L. Seymour, Oakmont, Pa., assignor to Pittsburgh Plate Glass Company, Pittsburgh, Pa., a corporation of Pennsylvania
Filed Apr. 27, 1967, Ser. No. 634,263
2 Claims. (Cl. 65—111)

ABSTRACT OF THE DISCLOSURE

Tongs for gripping glass sheets for thermal treatment having glass engaging members and means sufficiently close to said glass engaging members to retard the heating rate of a glass sheet portion gripped by said glass engaging members compared to that of the main body of the glass sheet. The coefficient of friction of the glass engaging members with glass is increased by engaging the glass sheets with heated tongs for the heating step. The heating rate of the tong gripped glass sheet is correlated with the means so that when the main body of glass reaches an elevated temperature above the strain point suitable for further processing, the glass sheet portion reaches a temperature between the strain point of the glass and the temperature of the main body. This reduces the tendency of the tong gripping elements to distort the heated glass sheet.

---

This invention relates to glass gripping tongs and treatment thereof, and particularly refers to tongs adapted to suspend glass sheets and the like during thermal treatment. The tongs have arms pivoted together and glass engaging members carried by the arms. The arms and their glass engaging members are arranged to urge the glass engaging members toward each other when the tongs are suspended so as to grip the glass sheet therebetween.

Glass sheets have been suspended by tongs which grip the upper glass sheet surfaces near the upper glass edge for thermal treatment involved in tempering, coating, press bending, and combinations of these operations which involve conveying the glass sheets through atmospheres of different temperatures where the glass is subject to such treatment.

The glass contacting members of the prior art tongs left something to be desired. They depended primarily on the gripping force resulting from adjusting the pivot points of the respective tong arms to produce a mechanical advantage that provided a maximum gripping force per unit weight of tong. At the same time, the prior art tried to make the glass gripping tongs as small as possible in the belief that such tongs operated efficiently by providing minimum obstruction to the application of heat to the glass during the heating of the glass to an elevated temperature above its strain point necessary for working the glass. It was also believed that tongs having small dimensions would interfere to a minimum degree with the free flow of fluid (quenching fluid or a fluid coating forming composition) used to coat or temper the heated glass sheets.

Traditionally, the glass engaging elements of tongs have been in the form of stainless steel pins whose pointed extremities penetrated the major surfaces of the glass. When it is necessary to heat glass to a working temperature hotter than 1200 degrees Fahrenheit, the glass softens, permitting penetration of the metal tips of the glass engaging members. The penetrated glass tends to develop vents and other flaws that spoil the optical qualities of the glass and also weaken the glass sheet.

It has been proposed in U.S. Patent No. 3,273,933 to Jochim to incorporate crystalline grains in a metal binder and have only the crystalline grains contact the glass. Such tongs are useful as long as the grains remain intact. However, such grains of crystalline material wear quite rapidly and the glass is immediately exposed to direct contact with the metal as in prior art tongs.

In U.S. Patent No. 3,089,727 to Hay, the glass engaging elements are in the form of freely rotatable discs whose peripheral margins engage the glass. Such tongs tend to apply the gripping force over a larger rounded area instead of at a single point and hence result in less damage to the glass surface than pointed tongs. However, the large gripping force applied by the glass gripping members of stainless steel at elevated temperatures required to heat the glass for tempering causes some penetration and optical distortion in the region of the glass that is gripped between the glass engaging discs of the Hay tongs.

It has now been found that it is possible to reduce the glass penetration and distortion resulting from gripping the glass by tongs by providing heat absorbing means on the tong structure sufficiently close to the glass gripping members in sufficiently close proximity to a glass sheet portion gripped by the tongs to retard the rate of temperature increase in said glass sheet portion engaged by said glass engaging members, but sufficiently distant from the main body of the suspended glass sheet to have a negligible effect on the heating rate of said main body in response to exposure of said tong gripped glass sheet to a hot atmosphere. As long as the glass sheet portion engaged by the tongs is heated to the strain point of the glass at least, the glass does not develop "chill crack" or otherwise form an incipient break in said portion. At the same time, the lower temperature of the glass portion engaged by the glass engaging members of the tongs makes the glass less susceptible of distortion by virtue of its engagement by solid members.

The present invention uses the principal that tongs can grip glass sheets with a lesser gripping force than that considered necessary by the prior art provided steps are taken to increase the initial frictional force between the glass gripping elements and the tongs. The present invention accomplishes this by gripping the glass sheet with tongs that are sufficiently hotter than normal room temperature when initially engaging the glass to have a significantly greater coefficient of friction with glass than at normal room temperature.

The heat absorbing means carried by the tongs that retard the heating rate of the glass sheet portion engaged by the glass engaging members of the tongs without having a significant effect on the heating rate of the main body of the glass may be any of several embodiments. For example, the means may comprise a heat reflecting coating for glass engaging members. Such a heat reflecting coating retards the temperature rise of the glass engaging members and affects the temperature of the glass sheet portion engaged thereby as the glass is heated to an elevated temperature above the strain point sufficient for further working. The means may comprise a mass of heat absorbing material carried by the tongs in sufficiently close adjacency to the glass engaging members to affect the temperature rise of the glass sheet portion engaged by the glass engaging members. In order for such tongs to work as planned, the glass must be heated to its elevated temperature at a rapid rate so that the difference in response of the main body of the glass and that of the tongs to the change in temperature to which they are simultaneously exposed is not reduced by thermal conductivity to the point where the difference in temperature is not significant.

Several preferred embodiments of the present invention will now be described in order to facilitate an understanding of the present invention.

In the drawings which form part of the description, and wherein like reference numerals refer to similar structural elements, FIG. 1 is a fragmentary elevational view of a pair of glass gripping tongs taken across the thickness of the upper portion of the glass sheet;

FIG. 4 is a fragmentary section view of one embodiment of glass engaging member as taught by the present invention taken along the lines IV—IV of FIG. 2;

Figure 1:
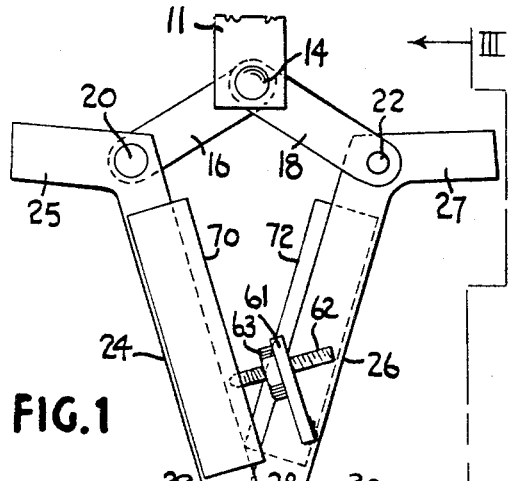

In the drawings, an apertured clevis 11 is carried by a carriage (not shown) supported on a monorail (not shown). The latter extends through a heating furnace of tunnel-like configuration and a fluid imparting apparatus, neither of which is shown but both of which are well known in the art.

The fluid imparting apparatus may be either an air blasting station for tempering or heat-strengthening heated glass sheets suspended on tongs or a fluid spraying station to impart a coating to the tong suspended glass sheets. Since neither the heating furnace nor the air blasting or fluid spraying stations are part of the present invention, they are not described in detail herein.

The apertured clevis 11 supports a tong support pin 12 through its aperture. Enlarged head riviets 14 secure the tong support pin 12 in place on the clevis. Links 16 and 18 are pivoted to tong support pin 12 at their upper ends. At their lower ends, links 16 and 18 carry one of a pair of link pins 20 and 22. Link pins 20 and 22 are provided with enlarged head rivets for the same purpose as tong support pin 12.

A tong arm 24 having a horizontal extension 25 is apertured at its upper portion to receive link pin 20 and a tong arm 26 having a horizontal extension 27 is apertured at its upper portion to receive link pin 22. Link pin 20 pivotally attaches the upper portion of tong arm 24 to the lower portion of link 16, whereas link pin 22 pivotally secures the lower portion of link 18 to the upper portion of tong arm 26.

A common hinge pin 28 secures tong arms 24 and 26 to one another near their lower portion. The common hinge pin 28 is apertured to receive a cotter pin 29 to avoid separation between the tong arms 24 and 26 at their lower pivoted connection.

Beyond the common hinge pin 28, tong arm 24 forms a lower apertured extension 30 and tong arm 26 forms a similar apertured extension 32. A rod 34 extends through a vertical aperture in apertured extension 30 and a similar rod 36 extends through a vertical aperture in apertured extension 32. Each rod has a diametrically extending hole that matches with cross holes extending horizontally through the apertured extensions 30 and 32. This permits cotter pins 38 and 40 to secure the rods 34 and 36 to extensions 30 and 32.

The lower end of rod 34 has an enlarged head 42 and the lower end of rod 36 has a similar enlarged head 44. A first glass engaging member comprising a disc 46 is rotatably mounted around rod 34 and makes bearing contact with the upper surface of head 42. Another glass engaging member comprising a disc 48 is similarly mounted around rod 36 to make bearing contact with the upper surface of head 44. Each disc is apertured and forms a bottom flange of a flanged sleeve. A sleeve 50 extends upward from the apertured disc 46 and another sleeve 52 extends upward from apertured disc 48. The sleeves 50 and 52 form a unitary structure with the apertured discs and are rotatably mounted around rods 34 and 36 respectively. The discs 46 and 48 have larger diameters than the heads 42 and 44 and are concentrically mounted about the rods 34 and 36 respectively. Thus, their peripheral edges, which are about .06 inch thick, make free rotating contact with the opposite major surfaces of the glass sheet G. It is thus seen that the discs 46 and 48 serve as glass engaging members carried by the tong arms 24 and 26 wherein the arms 24 and 26 and the glass engaging elements 46 and 48 are arranged to urge the glass engaging elements toward each other when the tongs are freely suspended.

The tongs are also provided with a stop member 55 formed as a thin shim having a convexly rounded bottom edge that contacts the upper edge of the glass sheet G to prevent the latter from entering too deeply into the tongs. By controlling the uppermost position of the glass within the tongs, any tong marking is limited to a location very close to the uppermost edge of the glass and is hidden in the frame within which the fabricated glass article is installed. Tongs provided with such a stop are described and claimed in U.S. Patent No 2,991,114 to Lee R. Robinson.

The improved tongs of the present invention were also provided with an adjustable limit means 60 to limit the closest approach of the glass engaging elements to one another, for example, about .09 inch for tongs processing glass sheets of ⅛ inch thickness, or about .16 inch for processing glass sheets of 3/16 inch thickness and about .22 inch for processing glass sheets of ¼ inch thickness. The limit means 60 comprises an apertured plate 61 with an externally threaded shaft 62 adjustable lengthwise through the aperture in plate 61 and a lock nut 63 to fix the position of the shaft 62 relative to plate 61. The plate 61 is welded to the tong arm 26 with shaft 62 extending toward the side wall of tong arm 24. When the glass engaging members (tong discs 46 and 48) engage the heat-softened glass sheet G, their penetration into the glass is limited by the end of shaft 62 abutting the side wall of tong arm 24, thus preventing further tong penetration into the glass. However, this limit means 60 is a device needed with prior art tongs to control maximum tong penetration and is only included with the presently disclosed tongs as a safety feature in case of accidental overheating of the glass due to temperary loss of furnace control.

The tongs are also provided with addition heat absorbing means, such as masses of metal 70 and 72. Metal mass 70 is welded to the outer surface of the lever arm 24 and metal mass 72 is similarly connected to the outer surface of the lever arm 26. The metal masses 70 and 72 have sufficient thermal capacity to react more slowly than the glass sheet to a change in temperature. The metal masses 70 and 72 are located in sufficiently close proximity to the glass engaging members 46 and 48 to affect the rate of temperature change of the glass sheet portions in the vicinity of the glass sheet engaging members. Therefore, when a glass sheet is gripped by tongs having additional heat absorbing masses 70 and 72 attached thereto and the tong supported glass sheet is introduced into a furnace, the metal masses carried by the tongs selectively absorbs heat from the atmosphere in the vicinity of the upper edge portion of the glass sheet gripped by the tongs until such time as its temperature reaches that of the surrounding atmosphere. Since most glass sheet treatment furnaces heat the main body of the glass sheet to an elevated temperature above its strain point that is required for further processing in a few minutes, and since the ability of the metal masses to absorb heat from the surrounding atmosphere diminishes rapidly with increased distance from the metal masses, the metal masses act as means to retard the heating of the portion of the glass sheet adjacent the tongs, but have no significant effect on the rate of heating the main body of the glass sheet.

Glass sheets gripped by tongs having means for retarding the rate of temperature change in a glass sheet portion engaged by glass engaging members were compared with glass sheets suspended from tangs of the prior art. The glass sheets gripped by the tongs of the present invention had vastly superior optical properties characterized by less distortion and less visible tong penetration marks than glass sheets subjected to the same temperature treatment, but gripped by tongs omitting the heat-absorbing metal masses.

It is believed that the superior optical properties of tempered glass sheets produced by heating them to a temperature of their main body portion of about 1220 degrees Fahrenheit in less than four minutes followed by sudden quenching resulted from the ability of the metal masses to retard the heating rate of the glass sheet portion in the vicinity of the glass gripping members. The latter glass sheet portion was more resistant to tong penetration and distortion resulting from tong movement relative to the glass during the time the main body of glass was heated to its elevated temperature because the latter portion never reached the elevated temperature of the main body before chilling started.

However, unless the temperature of the glass sheet portion in the vicinity of the glass gripping members of the tongs reached the strain point of the glass, the glass became likely to be rejected for "chill cracking." This experience indicated the importance of keeping the mass of heat absorbing material within limits to provide sufficient mass to retard the heating of the glass sheet portion near the tongs and yet insufficient mass to prevent the latter glass sheet portion from reaching the strain point of glass.

For tongs of stainless steel comprising arms 3 inches long by 3/8 inch wide by 3/16 inch thick having apertured extensions about 3/8 inch thick apertured to receive pins one inch long and 3/16 inch in diameter with stops of shim stock 1/32 inch thick and extending with an arcuate bottom edge that kept the upper edge of a tong-gripped glass sheet about 3/16 inch from the tongs, the glass gripping elements used were apertured discs 3/4 inch in diameter and 1/16 inch thick attached to the bottom of sleeves 1/16 inch thick and 1/2 inch tall having an outer diameter of about 5/16 inch. The enlarged heads were 5/16 inch in diameter and 1/8 inch thick and the metal masses were about 2 inches long, 1 inch wide and 1/2 inch thick with their lower edges about 1 inch above the upper edge of the supported glass sheet.

In processing glass sheets 3/16 inch thick, the tongs were heated to a temperature of between about 150 and 200 degrees Fahrenheit and glass sheets at normal room temperature (about 80 degrees Fahrenheit) were inserted into the tongs for gripping thereby. The tongs and their supported glass sheets were heated in an enclosed furnace for about 3 minutes and 45 seconds and immediately removed from the furnace for quenching by air blasts through opposed sets of nozzles about 5 inches apart blasting air against the opposite glass sheet surfaces at a plenum pressure of 8 to 10 ounces per square inch. The nozzles of 1/2 inch diameter circular configuration were arranged in diamond array on 2 inch centers and were moved in circular paths of 2 inch diameter to provide overlapping of the area of glass sheet swept by each nozzle. Such a pattern of overlapping air blasts, nozzle arrangements and plenum pressures is well known in the art and details vary for treating glass sheets of different thickness, chemical composition and thermal history.

It was found that a smaller gripping force sufficed to hold the glass sheets initially engaged by the heated tongs. By engaging the glass sheets with relatively hot tongs, the coefficient of friction between the glass and the tongs became sufficiently high to reduce the gripping force needed, and therefore, reduced the tendency of the tongs to penetrate into the glass and cause optical distortion.

Figure 2:
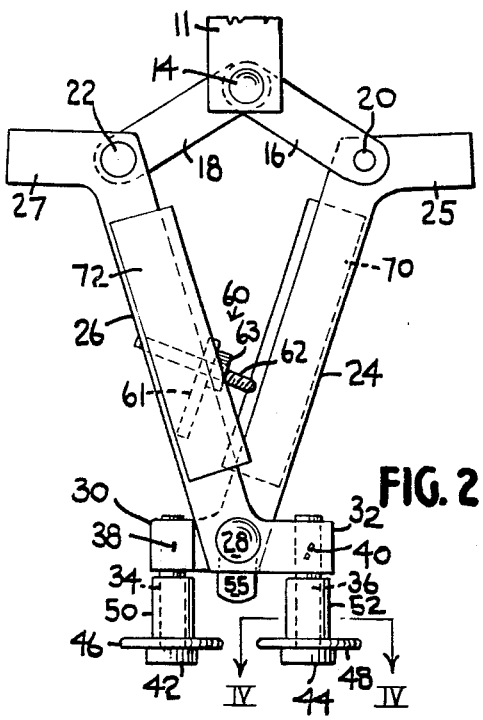
FIG. 2 is a view similar to FIG. 1 of the reverse side of the pair of tongs.
Figure 3:
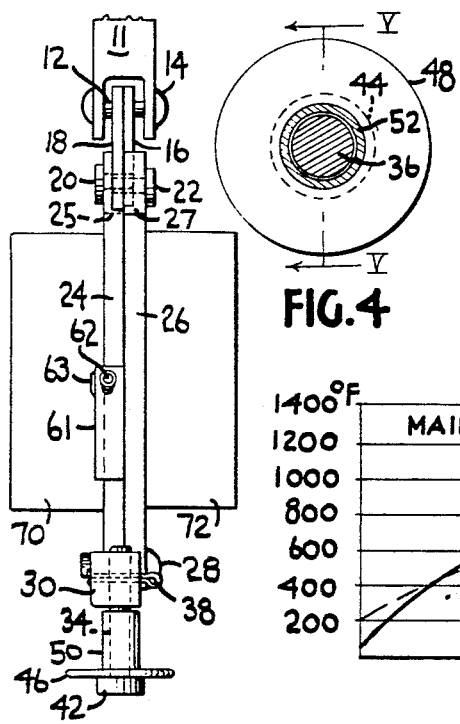
FIG. 3 is an end view taken along the lines III—III of FIG. 1.

The use of metal masses 70 and 72 attached to the tong arms as depicted in FIGS. 1 to 3 represents one embodiment of apparatus capable of accomplishing the benefits of the present invention. Other tong structures that improve resistance of the glass sheet portion to tong penetration and/or distorting locally because of tong pull are shown in detail in FIGS. 5 and 6. Either of these latter structures may be either substituted for the metal masses or used in combination with the metal masses on the tong arms to obtain the desired effect of providing the glass sheet portion in the vicinity of the glass gripping members with characteristics enabling them to moderate, if not eliminate, the above defects.

Figure 5:
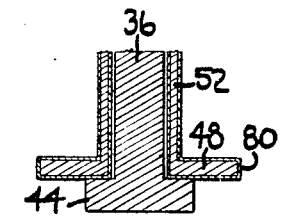
FIG. 5 is a fragmentary sectional view taken along the lines V—V of FIG. 4.

The tong structure containing the glass gripping members in the form of freely rotatable discs is described and claimed in U.S. Patent No. 3,089,727 to William J. Hay. The prior art tongs has glass engaging members made of stainless steel. The discs 46 and 48, which form the glass engaging members of the tongs exemplifying another embodiment of the present invention illustrated in FIG. 5, are provided with a thin coating 80 having high heat reflecting properties. The heat reflecting coating 80 may be of any material that adheres to the metal disc over the temperature range normally encountered in glass sheet treatment for the processes enumerated above. Aluminum paint has the desired properties.

Figure 7:
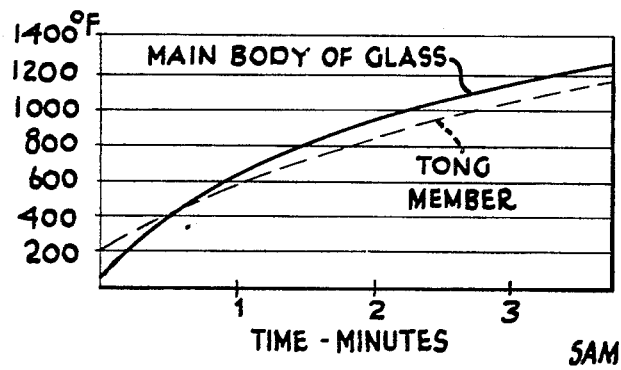
FIG. 7 is a time-temperature chart showing the temperature of a glass engaging member of the type depicted in FIG. 5 and that of the main body of a glass sheet during a heating step of a typical thermal treatment following the present invention.

The thin coating 80 is applied to the entire surface of the glass engaging member or disc. When the tongs and the glass are heated in a furnace, the heat reflecting coating 80 causes the glass engaging members 46 and 48 to remain relatively cool rather than absorb furnace heat and increase its temperature at the same rate of temperature increase as the main body of the glass sheet. The relatively cool glass engaging members thus serve as heat sinks to selectively absorb some of the heat in the glass sheet portion adjacent thereto. A comparison of temperatures for a typical experiment performed to test this embodiment is shown in FIG. 7.

Figure 6:
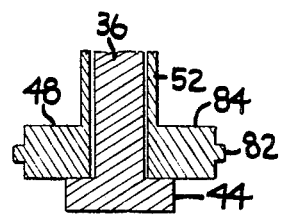
FIG. 6 is a view similar to FIG. 5 of another embodiment of glass engaging member according to the present invention.

Still another embodiment is shown in FIG. 6, where the glass engaging discs are 3/4 inch in diameter as in the other embodiments. However, only the peripheral rim portion 82 that engages the glass sheet G is 1/16 inch thick. The remainder of the disc 46 except for the peripheral rim of about 1/32 inch width comprises a thicker inner portion 84 about 3/16 inch thick. The thermal capacity of the thicker inner portion is such that it retards the heating rate of the glass sheet portion gripped by the glass gripping members of the tongs without having any substantial effect on the temperature of the main body of the glass sheet as is accomplished by the other embodiments.

The forms of the invention shown and described in this disclosure represent illustrative preferred embodiments thereof. It is understood that various changes may be made without departing from the spirit of the invention as defined in the claimed subject matter that follows.

What is claimed is:

1. In the method of heat treating glass wherein a glass sheet is gripped by tongs and heated to an elevated working temperature above its strain point that is required for further processing of the heated glass, the improvement comprising gripping the glass with tongs having glass gripping members and a mass of sufficient thermal capacity in the vicinity of the glass sheet portion engaged by said glass gripping members that said mass is slower to change its temperature in response to a change in environmental temperature than the main body of said glass sheet, and heating the main body of said glass sheet while gripped by said tongs to its working temperature while selectively absorbing sufficient heat from the vicinity of said glass sheet portion engaged by said glass gripping members to retard the heating rate of said engaged glass sheet portion sufficiently to cause said engaged glass sheet portion to attain a maximum temperature below said working temperature but at least equal to the strain point while said main body of glass is heated to said working temperature, whereby said engaged glass sheet portion is heated to a temperature sufficiently high to avoid chill cracking when said glass sheet is cooled after said main body is heated to said working temperature yet sufficiently below said working temperature to cause said portion to resist tong penetration to a significantly greater degree than it can resist tong penetration in the absence of said selective heat absorption.

2. In the method according to claim 1, wherein said glass sheet is initially engaged by said glass gripping members when said members are at a temperature sufficiently above normal room temperature to have a significantly greater coefficient of friction with glass than if said members are at normal room temperature when initially engaging the glass, said coefficient of friction being sufficiently high to enable said glass gripping members to hold said glass sheet at room temperature without slippage with a minimum of gripping force.

References Cited
UNITED STATES PATENTS

| | | | |
|---|---|---|---|
| 2,103,850 | 12/1937 | Hinsey | 294—118 |
| 3,025,638 | 3/1962 | Krawetzke et al. | 214—1 |
| 3,084,969 | 4/1963 | Davidson et al. | 294—118 |
| 3,089,727 | 5/1963 | Hay | 294—118 |

EVON C. BLUNK, *Primary Examiner.*

EDWARD A. SROKA, *Examiner.*

R. D. GUIOD, *Assistant Examiner.*